(12) United States Patent
Niiyama et al.

(10) Patent No.: US 8,592,039 B2
(45) Date of Patent: Nov. 26, 2013

(54) CURABLE RESIN COMPOSITION, TRANSPARENT LAMINATE USING THE SAME, AND PROCESS FOR PRODUCING THE TRANSPARENT LAMINATE

(75) Inventors: Satoshi Niiyama, Tokyo (JP); Naoko Aoki, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/555,778

(22) Filed: Jul. 23, 2012

(65) Prior Publication Data

US 2012/0288719 A1 Nov. 15, 2012

Related U.S. Application Data

(63) Continuation of application No. 12/692,701, filed on Jan. 25, 2010, now Pat. No. 8,268,447, which is a continuation of application No. PCT/JP2008/062627, filed on Jul. 11, 2008.

(30) Foreign Application Priority Data

Jul. 30, 2007 (JP) ................................. 2007-197571

(51) Int. Cl.
*B32B 27/40* (2006.01)
*B32B 37/12* (2006.01)

(52) U.S. Cl.
USPC ................... 428/425.6; 156/331.4; 156/331.7

(58) Field of Classification Search
USPC ................. 428/423.1, 425.6; 156/295, 331.1, 156/331.4, 331.7
See application file for complete search history.

(56) References Cited

U.S. PATENT DOCUMENTS

| | | | |
|---|---|---|---|
| 4,724,023 A | 2/1988 | Marriott | |
| 4,969,966 A | 11/1990 | Norman | |
| 5,776,364 A * | 7/1998 | Niiyama et al. | 252/299.01 |
| 6,086,795 A | 7/2000 | Hatton | |

(Continued)

FOREIGN PATENT DOCUMENTS

| EP | 56719 | 7/1982 |
|---|---|---|
| EP | 0 149 867 A2 | 7/1985 |

(Continued)

OTHER PUBLICATIONS

Extended European Search Report issued Jan. 20, 2011, in Patent Application No. 08791108.7.

*Primary Examiner* — Thao T. Tran
(74) *Attorney, Agent, or Firm* — Oblon, Spivak, McClelland, Maier & Neustadt, L.L.P.

(57) ABSTRACT

To provide a transparent laminate having a pair of transparent substrates integrated via an adhesive layer, in which the adhesive layer has good tear resistance and good adhesion to the transparent substrates and has excellent transparency.

In a first atmosphere, a sealed space having a curable resin composition 14 accommodated between a pair of transparent substrates 10a and 10b, is formed, and then the curable resin composition 14 is cured in a state where the outside of the sealed space is made to be a second atmosphere having a pressure higher than the first atmosphere. As the above curable resin composition, a curable resin composition comprising a urethane oligomer (a) having from 1.8 to 4 curable functional groups on average which are either or both of an acryloyloxy group and a methacryloyloxy group, per molecule, and a hydroxyalkyl methacrylate (b) having a $C_{3-8}$ hydroxyalkyl group having 1 or 2 hydroxy groups, is used.

19 Claims, 4 Drawing Sheets

(56) References Cited

U.S. PATENT DOCUMENTS

| | | | |
|---|---|---|---|
| 2004/0010049 A1 | 1/2004 | Takahashi et al. | |
| 2010/0215966 A1 | 8/2010 | Ito et al. | |
| 2012/0121914 A1* | 5/2012 | Kadowaki et al. | 428/423.1 |

FOREIGN PATENT DOCUMENTS

| | | |
|---|---|---|
| EP | 0 149 867 A3 | 7/1985 |
| GB | 2 002 009 A | 2/1979 |
| JP | 60-051766 | 3/1985 |
| JP | 06-024810 | 2/1994 |
| JP | 10-287449 | 10/1998 |
| JP | 05-255464 | 10/2003 |
| JP | 2005-1953 | 1/2005 |
| JP | 2005-041747 | 2/2005 |
| JP | 2006-045549 | 2/2006 |
| WO | WO 2006/046864 A1 | 5/2006 |
| WO | WO 2008/081838 A1 | 7/2008 |

* cited by examiner

«CURABLE RESIN COMPOSITION, TRANSPARENT LAMINATE USING THE SAME, AND PROCESS FOR PRODUCING THE TRANSPARENT LAMINATE

CROSS-REFERENCE TO RELATED APPLICATIONS

The present application is a continuation application of Ser. No. 12/692,701, allowed, which is a continuation of PCT/JP08/062,627 having a filing date of Jul. 11, 2008 and which claims priority to JP 2007-197571 having a filing date of Jul. 30, 2007.

TECHNICAL FIELD

The present invention relates to a curable resin composition suitable for a process for producing a transparent laminate by curing the curable resin composition interposed between a pair of transparent substrates, a process for producing a transparent laminate by using the curable resin composition, and a transparent laminate obtainable by the production process.

BACKGROUND ART

Laminated glass having a pair of glass transparent substrates integrated via an adhesive layer, is used as windshield glass for automobiles since it has a merit that fragments of broken glass are adhered to the film without scattering, and it is also used as window glass (safety glass or security glass) for buildings since it is hard to be penetrated and is excellent in strength.

An adhesive layer in a laminate such as laminated glass is required to have good adhesion to a transparent substrate and tear resistance, in addition to excellent transparency.

As a process for producing the laminated glass, the following processes are disclosed in Patent Documents 1 and 2. First, a plate-shaped container having a pair of glass transparent substrates laminated via an adhesive spacer interposed therebetween, is prepared. At that time, a part of the spacer is opened. Then, an uncured curable resin composition is injected from the opening of the spacer, and then the opening of the spacer is plugged to be closed, and the curable transparent resin composition is cured to produce the laminated glass.

Patent Document 1: JP-A-2005-41747
Patent Document 2: JP-A-60-51766

DISCLOSURE OF THE INVENTION

Object to be Accomplished by the Invention

However, the processes disclosed in Patent Documents 1 and 2 are inadequate in productivity since bubbles are formed when the uncured curable resin composition is injected into the plate-shaped container formed from a pair of the glass transparent substrates and removal of the bubbles takes a time.

Further, there are no problems when a commonly known acrylic or methacrylic curable resin composition is cured in a relatively thin shape for e.g. a coating film, an adhesive layer or a stick layer, but in the case of an adhesive layer for laminated glass, it is relatively thick at a level of from about a few hundred μm to a few mm, and therefore the tear resistance or the adhesion to a transparent substrate is insufficient due to the non-uniformity in the curing reaction in some cases. It is considered that this is because of the dramatic increase in the viscosity of the composition due to the curing reaction in the curing step, and especially in photocuring of which the curing rate is high, the viscosity tends to increase dramatically and the curing reaction tends to proceed non-uniformly.

The present invention has been made under the above circumstances, and it is an object of the present invention to provide a curable resin composition for producing a transparent substrate having a pair of transparent substrates integrated via an adhesive layer which has good tear resistance and good adhesion to the transparent substrates, and further has excellent transparency.

Further, it is an object of the present invention to provide a process for producing such a transparent laminate with good productivity while formation of bubbles in the adhesive layer is suppressed, and to provide the transparent substrate.

Means to Accomplish the Object

The curable resin composition of the present invention is a curable resin composition to be used for a process for producing a transparent laminate by curing the curable resin composition interposed between a pair of transparent substrates, comprising a urethane oligomer (a) having from 1.8 to 4 curable functional groups on average which are either or both of an acryloyloxy group and a methacryloyloxy group, per molecule, and a hydroxyalkyl methacrylate (b) having a $C_{3-8}$ hydroxyalkyl group having 1 or 2 hydroxy groups.

The urethane oligomer (a) preferably has an oxyalkylene chain.

Further, the curable resin composition preferably contains an alkyl methacrylate (c) having a $C_{8-22}$ alkyl group.

All of the curable functional groups of the urethane oligomer (a) are preferably acryloyloxy groups.

The urethane oligomer (a) is preferably a reaction product of a polyoxyalkylene polyol (i) having from 1.8 to 4 hydroxy groups on average per molecule, an aliphatic or alicyclic diisocyanate (ii) and a hydroxyalkyl acrylate or a hydroxyalkyl methacrylate (iii).

It is preferred that the content of the urethane oligomer (a) is at least 20 mass %, and the content of the hydroxyalkyl methacrylate (b) is at least 25 mass %, in the curable resin composition.

The content of the alkyl methacrylate (c) is preferably at most 50 mass %, in the curable resin composition.

The curable resin composition is preferably a photocurable resin composition containing a photopolymerization initiator.

The present invention provides a process for producing a transparent laminate, comprising a first step of forming a sealed space having the curable resin composition of the present invention internally accommodated between a pair of transparent substrates, in a first atmosphere, and a second step of curing the curable resin composition in a state where the outside of the sealed space is made to be a second atmosphere having a pressure higher than the first atmosphere.

It is preferred that in the first step, a sealed portion is provided on the periphery of the surface of one transparent substrate, and the curable resin composition is supplied to the area surrounded by the sealed portion, and in the above first atmosphere, the other transparent substrate is pushed towards the surface of the above one transparent substrate to expand the curable resin composition and to form the sealed space having the curable resin composition interposed between the pair of the transparent substrates at the same time.

It is preferred that the pressure in the above first atmosphere is at most 1 kPa, and the pressure in the above second atmosphere is higher by at least 100 kPa than the pressure in the above first atmosphere.

At least one of the pair of the transparent substrates is preferably a glass plate.

The pair of the transparent substrates may be a pair of curved substrates having almost the same curvature.

Further, the present invention provides a transparent laminate comprising a pair of transparent substrates and a cured resin layer interposed between the pair of the transparent substrates, wherein the cured resin is a cured product of the curable resin composition.

The transparent laminate is preferably a transparent laminate with a size having at least one side being 600 mm or longer.

Effect of the Invention

According to the curable resin composition of the present invention, it is possible to obtain a transparent laminate having a pair of transparent substrates integrated via an adhesive layer which has good tear resistance and good adhesion to the transparent substrates, and further has excellent transparency.

According to the process for producing a transparent laminate of the present invention, it is possible to produce a transparent laminate having a pair of transparent substrates integrated via an adhesive layer which has good tear resistance and good adhesion to the transparent substrates, and further has excellent transparency, with good productivity and without any operation for removing bubbles in the adhesive layer.

In the transparent laminate of the present invention, the adhesive layer has good tear resistance and good adhesion to the transparent substrates, and further has excellent transparency.

BRIEF DESCRIPTION OF THE DRAWINGS

FIG. 1(A) is a plan view, and FIG. 1(B) is a cross-sectional view taken along the line b-b of FIG. 1(A).

FIG. 2(A) is a plan view, and FIG. 2(B) is a cross-sectional view taken along the line b-b of FIG. 2(A).

EXPLANATION OF SYMBOLS

Figure 1:
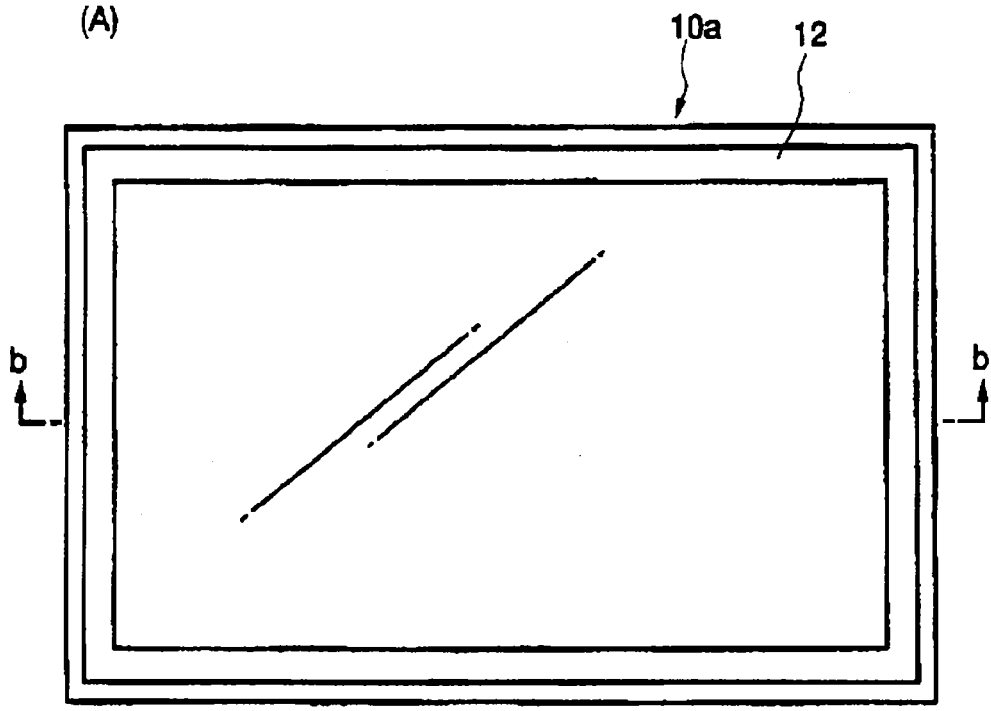
FIG. 1 is views illustrating a step of providing a sealing member in one embodiment of the production process of the present invention.
Figure 1:
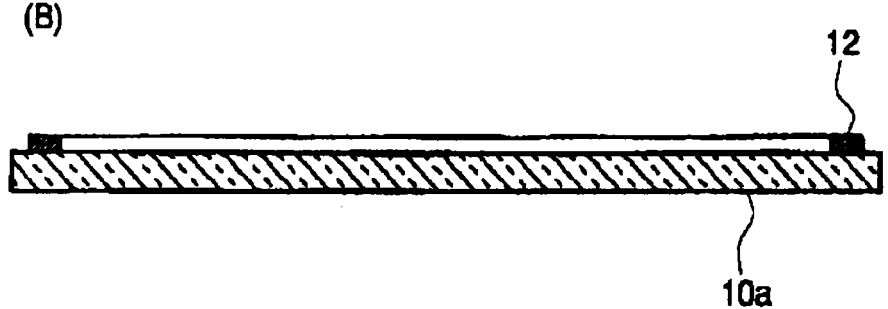

10$a$: One transparent substrate
10$b$: The other transparent substrate
12: Sealing member
14: Curable resin composition
26: Reduced pressure chamber
28: Vacuum pump
36: Curable resin for sealing
40: UV irradiation apparatus
42: High pressure mercury lamp

BEST MODE FOR CARRYING OUT THE INVENTION

The number average molecular weight (Mn) of the urethane oligomer in this specification was determined by gel permeation chromatogram using HLC-8220GPC, manufactured by TOSOH CORPORATION. As a sample, a 1.0 mass % THF solution obtained by filtration with a PTFE filter whose pore size is 0.45 μm was used, and as a column, two TSKgel GMH$_{HR}$, manufacture by TOSOH CORPORATION were used.

The number average molecular weight of the polyol in this specification was calculated from the hydroxy value "A" (KOH mg/g) measured in accordance with JISK1557-1 (2007 edition) and the number of hydroxy groups "B" in one molecule of the polyol, by means of the following formula (1):

$$\text{Molecular weight of polyol} = 56.1 \times B \times 1000/A \tag{1}$$

Further, in the case of a commercially available urethane oligomer, it is usually difficult to measure the hydroxy value or the number of hydroxy groups of a polyol as its raw material, and therefore the molecular weight of the polyol is estimated from the number average molecular weight of the urethane oligomer determined by the above gel permeation chromatogram and types of a hydroxyalkyl (meth)acrylate and a polyisocyanate as raw materials.

Further, in this specification, a (meth)acrylate represents a concept including one or both of an acrylate and a methacrylate. Likewise, a (meth)acryloyloxy group represents a concept including one or both of an acryloyloxy group and a methacryloyloxy group. For example, the above "a hydroxyalkyl acrylate or a hydroxyalkyl methacrylate (iii)" is referred to as "a hydroxyalkyl (meth)acrylate (iii)".

<Curable Resin Composition>

The curable resin composition of the present invention comprises a urethane oligomer (hereinafter sometimes referred to as "component (a)") having from 1.8 to 4 curable functional groups on average which are either or both of an acryloyloxy group and a methacryloyloxy group, per molecule, and a hydroxyalkyl methacrylate (hereinafter sometimes referred to as "component (b)") having a $C_{3-8}$ hydroxyalkyl group having 1 or 2 hydroxy groups. The component (a) preferably has a polyoxyalkylene chain. Further, the curable resin composition preferably contains an alkyl methacrylate (c) (hereinafter referred to as "component (c)") having a $C_{8-22}$ alkyl group.

[Component (a)]

The urethane oligomer (a) according to the present invention is a urethane oligomer having from 1.8 to 4 curable functional groups on average which are either or both of an acryloyloxy group and a methacryloyloxy group, per molecule.

When the number of the curable functional groups in the component (a) is at least 1.8 on average per molecule, at least a part of the curable resin composition has a cross-linked structure after cured, whereby it is easy to prevent a cured product from flowing and thereby being deformed when exposed to high temperature. Further, when the number is at most 4, it is easy to prevent the cured product from being brittle due to its too high cross-linking density. The number is preferably at least 1.9 and at most 3, particularly preferably at least 1.9 and at most 2.3.

The component (a) is preferably a product obtained by reaction of a polyol (i) having from 1.8 to 4 hydroxy groups on average per molecule, a non-yellowing diisocyanate (ii) and a hydroxyalkyl(meth)acrylate (iii).

As an example of the polyol (i) having from 1.8 to 4 hydroxy groups on average per molecule, to be used for preparation of the component (a), a polyoxyalkylene polyol such as polyoxyethylene glycol or polyoxypropylene diol, a polyester polyol or a polycarbonate polyol may be mentioned. Among them, it is particularly preferred to use a polyoxyalkylene polyol as the polyol (i). When the component (a) has a polyoxyalkylene chain, a highly flexible cured product even in a low temperature range can readily be obtained. As an oxyalkylene group constituting the polyoxyalkylene chain, a $C_{2-4}$ oxyalkylene group such as an oxyethylene group, an oxypropylene group or an oxytetramethylene group is preferred. The polyoxyalkylene chain may be constituted from at least two types of oxyalkylene groups, and in such a case, it is particularly preferably constituted from an oxyethylene group and an oxypropylene group. The polyoxyalkylene polyol preferably has from 1.9 to 3, particularly preferably from 1.9 to 2.3 hydroxy group on average per molecule.

As an example of the polyoxyalkylene polyol, a polyoxyalkylene diol such as polyoxyethylene glycol, polyoxypropylene diol or polyoxytetramethylene glycol may be mentioned. The number average molecular weight (Mn) of the polyoxyalkylene polyol per hydroxy group is preferably from 400 to 8,000. The number average molecular weight (Mn) per hydroxy group is particularly preferably from 600 to 5,000. They may be used alone, or two or more of them may be used in combination.

As the polyester polyol, an aliphatic polyester diol having a residue of an aliphatic diol such as ethylene glycol, propylene glycol or 1,4-butanediol and a residue of an aliphatic dicarboxylic acid such as glutaric acid, adipic acid or sebacic acid, may be mentioned. As the polycarbonate polyol, an aliphatic polycarbonate diol having a diol residue such as 1,6-hexanediol, or an aliphatic polycarbonate diol such as a ring opening polymer obtained from an alicyclic carbonate, may be mentioned. The number average molecular weight (Mn) thereof per hydroxy group is preferably from 400 to 8,000, more preferably from 800 to 6,000.

In the present invention, the glass transition temperature (Tg) of a cured product obtainable by curing only the component (a) is preferably 0° C. or lower, more preferably −20° C. or lower. When Tg of the cured product obtainable by curing only the component (a) is 0° C. or lower, by combination with the component (b), it is easy to obtain good tear resistance and adhesion in the adhesive layer of the laminate. When the above polyoxyalkylene polyol is used for preparation of the component (a), the component (a) providing such a low glass transition temperature can readily be obtained.

The non-yellowing diisocyanate (ii) to be used for preparation of the component (a) is a diisocyanate selected from the group consisting of an aliphatic diisocyanate, an alicyclic diisocyanate and a non-yellowing aromatic diisocyanate. Among them, as an example of the aliphatic polyisocyanate, hexamethylene diisocyanate, 2,2,4-trimethyl-hexamethylene diisocyanate or 2,4,4-trimethyl-hexamethylene diisocyanate may be mentioned. As an example of the alicyclic polyisocyanate, isophorone diisocyanate or methylenebis(4-cyclohexyl isocyanate) may be mentioned. As the non-yellowing aromatic diisocyanate, xylylene diisocyanate may, for example, be mentioned. They may be used alone, or two or more of them may be used in combination.

Especially, an aliphatic or alicyclic diisocyanate is more preferred from the viewpoint of suppressing yellowing of the adhesive layer when a laminate is used outside.

As an example of the hydroxyalkyl(meth)acrylate (iii) to be used for preparation of the component (a), a (meth)acrylate having a $C_{2-6}$ hydroxyalkyl group, preferably a $C_{2-4}$ hydroxyalkyl group, such as 2-hydroxyethyl(meth)acrylate, 2-hydroxypropyl(meth)acrylate or 4-hydroxybutyl(meth)acrylate, may be mentioned. Further, it is also possible to use a mono(meth)acrylate from a relatively low molecular weight polyoxyalkylene diol. The number average molecular weight thereof is preferably at most 400, particularly preferably at most 200. They may be used alone, or two or more of them may be used in combination.

All of the curable functional groups of the urethane oligomer (a) are preferably acryloyloxy groups, and therefore, it is preferred to use e.g. a hydroxyalkyl acrylate as (iii).

When the curable functional groups of the component (a) are acryloyloxy groups, good tear resistance and adhesion in the adhesive layer of the laminate tend to be obtained. It is considered that this is because of the improvement in the uniformity of the curing reaction, by combination of the component (a) having acryloyloxy groups as the curable functional groups and hydroxyalkyl methacrylate (b). In a case where the curable functional groups of the component (a) are methacryloyloxy groups, it is possible to obtain good tear resistance and adhesion in the adhesive layer of the laminate by elongating an UV irradiation time or a heating time for curing. However, even in such a case, there are many cases where the tear resistance and the adhesion are inferior to the tear resistance and the adhesion in an adhesive layer obtainable by using the component (a) having acryloyloxy groups as the curable functional groups.

The component (a) may be prepared by a known method. For example, first of all, the above polyoxyalkylene polyol (i) and the above diisocyanate (ii) are blended so that the molar ratio (a molar ratio of NCO/OH) of the —OH group in (i) to the —NCO group in (ii) would be approximately 1/1.2 to 2 (NCO/OH≈1.2 to 2), and they are reacted in the presence of a catalyst such as a tin compound to obtain an isocyanate terminal prepolymer. The molar ratio of NCO/OH is more preferably from 1.6 to 2. Then, to the isocyanate terminal prepolymer, the above hydroxyalkyl(meth)acrylate (iii) is added so that the molar ratio (molar ratio of NCO/OH) of the —OH group in (iii) to the —NCO group in the prepolymer would be approximate 1/1 (NCO/OH≈1), and they are reacted to obtain the component (a).

The number average molecular weight of the component (a) is preferably at least 1,000, more preferably at least 3,000. When the number average molecular weight is at least 1,000, shrinkage between before and after the curing can be suppressed, whereby good mechanical strength can easily be obtained. Further, in order to obtain a uniform curable resin composition by mixing it with e.g. respective components in the component (b), the number average molecular weight of the component (a) is preferably at most 20,000, more preferably at most 15,000.

[Component (b)]

The component (b) is a hydroxyalkyl methacrylate having a $C_{3-8}$ hydroxyalkyl group having 1 or 2 hydroxy groups. Specifically, the component (b) is an ester of methacrylic acid ($CH_2=C(CH_3)COOR$), wherein R is a $C_{3-8}$ alkyl group, and further 1 or 2 hydrogen atoms bonded to R are substituted by hydroxy groups.

By the component (b) having a hydroxy group, good adhesion to the transparent substrates tends to be obtained. One having 1 or 2 hydroxy groups is readily available, but if the number of hydroxy groups are too large, the cured product tends to be too hard and brittle due to hydrogen bonds.

The number of carbon atoms in R is from 3 to 8, preferably from 3 to 6. If the number of carbon atoms is at most 2, the density of hydroxy groups in the component (b) tends to be high, and at the time of curing the curable resin composition combined with the component (a), phase separation tends to partly occur at the step of the curing reaction, whereby the haze of the cured product tends to be large. Further, if the number of carbon atoms is at least 9, there is a case where the density of the hydroxy groups is lowered, whereby no adequate adhesion is obtained.

Especially, it is more preferred that the number of hydroxy groups is 1 and further the number of carbon atoms is 4 to 6 in the hydroxyalkyl group of the component (b), since a cured product has high transparency, and further has good adhesion to the transparent substrates while maintaining proper flexibility.

As an example of the compound which can be used as the component (b), 2-hydroxypropyl methacrylate, 2-hydroxybutyl methacrylate, 4-hydroxybutyl methacrylate or 6-hydroxyhexyl methacrylate may be mentioned. Among them, 2-hydroxybutyl methacrylate is preferred.

[Component (c)]

The component (c) is an alkyl methacrylate having a $C_{8-22}$ alkyl group. Specifically, the component (c) is an ester of methacrylic acid ($CH_2$=$C(CH_3)COOR'$), wherein R' is a $C_{8-22}$ alkyl group. When the component (c) is incorporated, the elastic modulus in the cured product obtained from the curable resin composition is lowered, whereby the tear resistance tends to be improved.

When the number of carbon atoms in R' is at least 8, it is possible to lower the glass transition temperature of the cured product, and when it is at most 22, an alcohol as the raw material can readily be available from a natural product. In order to obtain a preferred elastic modulus of the cured product, the number of carbon atoms is more preferably from 12 to 18.

As an example of the compound which can be used as the component (c), n-dodecyl methacrylate, n-octadecyl methacrylate or n-behenyl methacrylate may be mentioned. Among them, n-dodecyl methacrylate or n-octadecyl methacrylate is preferred.

[Component (d)]

Into the curable resin composition of the present invention, a hydroxyalkyl acrylate (hereinafter sometimes referred to as "component (d)") having a $C_{4-8}$ hydroxyalkyl group with 1 or 2 hydroxy groups, may be incorporated.

Specifically, the component (d) is an ester of acrylic acid ($CH_2$=$CHCOOR''$), wherein R'' is a $C_{4-8}$ alkyl group, and further 1 or 2 hydrogen atoms bonded to R'' is substituted by a hydroxy group.

When the component (d) is incorporated, it is possible to improve the adhesion to the transparent substrates, and at the same time, it is also possible to impart the flexibility of the cured product. However, the component (d) is a component which cannot substitute for the component (b). Even if the component (d) is used instead of the component (b), adequate adhesion or tear strength cannot be obtained.

The number of carbon atoms in R'' is from 4 to 8, preferably from 4 to 6. When the number of carbon atoms in R'' is at least 4, it is possible to lower the glass transition temperature of the cured product, and if it is at most 8, from the viewpoint of the density of the hydroxy groups, it is possible to obtain good adhesion to the transparent substrates.

The number of hydroxy group bonded to the carbon atom in R'' is 1 or 2. By the presence of the hydroxy group, the adhesion to the transparent substrates is improved. If the number of hydroxy groups is at least 3, there is a case where the cured product becomes too hard.

As an example of the compound which can be used as the component (d), 4-hydroxybutyl acrylate, 2-hydroxybutyl acrylate or 6-hydroxyhexyl acrylate may be mentioned. Among them, 4-hydroxybutyl acrylate or 2-hydroxybutyl acrylate is preferred.

[Polymerization Initiator]

The curable resin composition may be a thermosetting resin composition obtained by incorporating a heat polymerization initiator therein, or may be a photocurable resin composition obtained by incorporating a photopolymerization initiator therein. The polymerization initiator may be one which can operate to accelerate the curing reaction of the components (a) to (d) by heating or light irradiation, and a known initiator may suitably be used.

As mentioned above, when curing is carried out by light irradiation, non-uniformity of the curing reaction tends to occur, but the present invention has an effect of improving such non-uniformity of the curing reaction. Accordingly, the present invention is highly effective especially in the method of curing a curable resin composition containing a photopolymerization initiator by light irradiation.

Further, photocuring is preferred from the viewpoint of good productivity and energy saving, and from the viewpoint it is also possible to use a transparent substrate which is likely to be deformed by heat.

As the photopolymerization initiator, it is preferred to use one which is excited and activated by irradiation with visible light or ultraviolet light (at a wavelength of from 300 to 400 nm) to accelerate the curing reaction. As a specific example, a benzoin ether type, α-hydroxyalkylphenone type or acylphosphine oxide type photopolymerization initiator may be mentioned. They may be used alone or in combination as a mixture of two or more of them.

Among them, as a preferred photopolymerization initiator, benzoin isopropyl ether, 1-hydroxy-cyclohexyl-phenyl-ketone, 1-[4-(2-hydroxyethoxy)-phenyl]-2-hydroxy-2-methyl-1-propan-1-one or bis(2,4,6-trimethylbenzoyl)-phenylphosphine oxide may, for example, be mentioned. Especially, an acylphosphine oxide type photopolymerization initiator such as bis(2,4,6-trimethylbenzoyl)-phenylphosphine oxide is preferred since it is possible to sufficiently cure the curable resin composition even when the photopolymerization initiator is added in a trace amount.

[Other Reactive Component]

Into the curable resin composition, other reactive component which induces curing reaction all at once, may be incorporated in the step of curing the components (a) to (d), without impairing the effect of the present invention.

Such other reactive component is preferably one having a boiling point of at least 150° C. under a normal pressure in order to prevent formation of bubbles in a step of the vacuum lamination method as mentioned below. Such other reactive component may, for example, be an amine type compound as a curing accelerator, a compound having an isocyanate group reactive with a hydroxy group, a compound having a thiol group as a chain transfer agent in the curing reaction or a silane coupling agent for improving the adhesion to the transparent substrates. Especially, by adding a small amount of the compound having a thiol group, such as 1,4-bis(3-mercaptobutyryloxy)butane, it is also possible to adjust the elastic modulus of the cured product.

[Other Additives]

Further, to the curable resin composition, a hydroquinone type or cresol type polymerization inhibitor, a benzotriazole type or hydroxyphenyltriazine type UV absorber, or e.g. a hindered amine type light stabilizer may properly be added, as the case requires. Further, a pigment or a dye may be added to change the color of light transmitted through the transparent laminate, or a trace amount of electroconductive fine particles such as ITO (indium tin oxide) may be dispersed to adsorb infrared rays. Furthermore, fine particles or a short fiber-form filler having a refractive index different from the curable resin composition after cured may uniformly be dispersed to change the properties of the light transmitted through the transparent laminate, or a filler which can realize a specific design within a range of the thickness of the curable resin composition may be added.

[Proportion]

In the curable resin composition of the present invention, the proportions of the respective components in the composition are preferably within the following ranges.

The content of the component (a) is preferably at least 20 mass %, more preferably at least 40 mass %. The content of (b) is preferably at least 25 mass %, more preferably at least 40 mass %. When the content of the component (a) is at least 20 mass %, a sufficient cross-linked structure can be obtained thereby to suppress the deformation at high temperature, and when the content of the component (b) is at least 25 mass %, the uniformity in the curing reaction can be achieved thereby to improve the tear resistance, and the adhesion to the transparent substrates can be also improved.

The content of the component (a) may be set depending upon the balance with other components, but is preferably at most 75 mass %, more preferably at most 65 mass %. The content of the component (b) may be set depending upon the balance with other components, but is preferably at most 60 mass %, more preferably at most 50 mass %.

The total content of the component (a) and the component (b) in the curable resin composition of the present invention is preferably at least 50 mass %, and particularly, more preferably at least 60 mass %. Further, the mass ratio (a)/(b) of the component (a) to the component (b) is preferably from 20/80 to 75/25, more preferably from 30/70 to 65/35.

The component (c) is not essential, but its content is preferably at least 3 mass %, more preferably at least 5 mass % when it is contained. If the content is at least 3 mass %, a sufficient flexibility-imparting effect tends to be obtained. The content of the component (c) may be set depending upon the balance with other components, but is preferably at most 50 mass %, more preferably at most 45 mass %.

The component (d) is not essential, but its content is preferably at least 1 mass %, more preferably at most 2 mass % when it is contained. When the content is at least 1 mass %, an effect of improving the adhesion to the transparent substrates tends to be obtained. The content of the component (d) may be set depending upon the balance with other components, but is preferably at most 15 mass %, more preferably at most 10 mass %.

The content of the above other reactive components is preferably at most 10 mass %, more preferably at most 5 mass %. Such other reactive components may not be contained.

When the photopolymerization initiator is added, the amount is preferably from 0.1 to 3 parts by mass, more preferably from 0.1 to 1 part by mass, based on 100 parts by mass of the total amount of the components (a) to (d) and the above other reactive components. The preferred amount to be added depends upon the effect of acceleration of curing by the photopolymerization initiator to be used, but when the amount is at least the lower limit of the above range, the effect of addition tends to be obtained sufficiently, and when it is at most the upper limit, e.g. yellowing due to ultraviolet irradiation after cured can be reduced, such being preferred.

When the heat polymerization initiator is added, the amount to be added is preferably from 0.5 to 3 parts by mass, more preferably from 0.5 to 1 part by mass, based on 100 parts by mass of the total amount of the components (a) to (d) and the above other reactive components. When the amount to be added is at least the lower limit of the above range, the effect of addition tends to be obtained sufficiently, and when it is at most the above upper limit, the molecular weight of the cured product can be increased, whereby the tear resistance can be improved, such being preferred.

[Viscosity]

In a state where the curable resin composition is uncured, the viscosity $V_{25}$ at 25° C. is preferably at least 0.05 Pa·s, and further the viscosity $V_{40}$ at 40° C. is preferably at most 50 Pa·s. The value of the viscosity in this specification is a value measured by the following method.

To a container (HT-2DB-100, manufactured by Brookfield Engineering) for viscosity measurement, about 10 g of a curable resin composition to be measured is put, the container is then disposed in a keep-warm apparatus for viscosity measurement, and the temperature of the composition is adjusted to a measuring temperature of 40° C. or 25° C. Then, a spindle (SC4-31, manufactured by Brookfield Engineering) for measurement attached to a viscometer (LVDV-II+ pro, manufactured by Brookfield Engineering) is immersed in the composition in the measuring container, thereafter this state is maintained for 15 minutes while the spindle is rotated at a speed set to a range of from 0.3 to 100 rpm depending upon the degree of the viscosity of the composition, and then the viscosity of the curable resin composition is measured.

In the curable resin composition, the larger the proportion occupied by the components (b) to (d) having a low molecular weight and the above other reactive components, the lower the viscosity of the composition. Further, the higher the molecular weight of the component (a), the higher the viscosity of the composition.

When the content of the component (a) is increased so that $V_{25}$ is at least 0.05 Pa·s, it is easy to suppress the shrinkage of the cured product, resulting from the curing, between before and after the curing. If the shrinkage between before and after the curing is large, distortion tends to remain in the cured product thereby to lower the mechanical strength. Further, in a case where the curable resin composition is interposed between a pair of transparent substrates by means of the vacuum lamination method, when $V_{25}$ is at least 0.15 Pa·s, particularly at least 0.5 Pa·s, it is effective to prevent the curable resin composition dropped on the transparent substrate from flowing over a seal previously formed on the periphery of the transparent substrate, at the time of laminating it with the other transparent substrate. When $V_{40}$ is at most 50 Pa·s, good flowability of the curable resin composition is readily obtained at the time of supplying the curable resin composition to the transparent substrate. Accordingly, especially in the case of employing the composition for the aftermentioned vacuum lamination method, the sealed space is readily filled with the curable resin composition in the second atmosphere. $V_{40}$ is particularly preferably at most 20 Pa·s.

In the case of the methods disclosed in the above Patent Documents 1 and 2, that is, a method (hereinafter referred to as "an injection filling method") of injecting a curable resin composition to a sealed space between substrates and curing the composition, it is difficult to use a highly viscous curable resin composition. Even when the highly viscous curable resin composition can be injected in such a narrow space between the substrates, it is extremely difficult to remove bubbles formed in the curable resin composition injected or in the space between the curable resin composition and the substrates. In the case of employing the injection filling method, it is considered that in order to readily remove the bubbles, $V_{25}$ of the curable resin composition is necessarily less than 0.15 Pa·s, particularly preferably at most 0.10 Pa·s.

Accordingly, among the curable resin compositions of the present invention, one having $V_{25}$ of at least 0.05 Pa·s and less than 0.15 Pa·s is suitable for application to the injection filling method, and one having $V_{25}$ of at least 0.15 Pa·s is suitable for application to the vacuum lamination method.

<Process for Producing a Laminate>

FIGS. 1 to 4 are views showing one embodiment of a vacuum lamination method suitable for producing a transparent laminate (hereinafter sometimes referred to simply as "a laminate") by using the curable resin composition of the present invention. FIG. 1(B) is a cross-sectional view taken along the line b-b of FIG. 1(A), and FIG. 2(B) is a cross-sectional view taken along the line b-b of FIG. 2(A). A process for producing the laminate of the present embodiment will be described with reference to these views.

First, a pair of rectangular transparent substrates 10a and 10b are prepared. As shown in FIG. 1, a double sided adhesive type sealing member 12 is fixed along four peripheral sides of one transparent substrate 10a. In this embodiment, a double sided adhesive tape 12 is adhered as the sealing member 12. The sealing member 12 is preferably one having a transparency (light transmission property) equal to that of a cured product of a curable resin composition 14.

Figure 2:
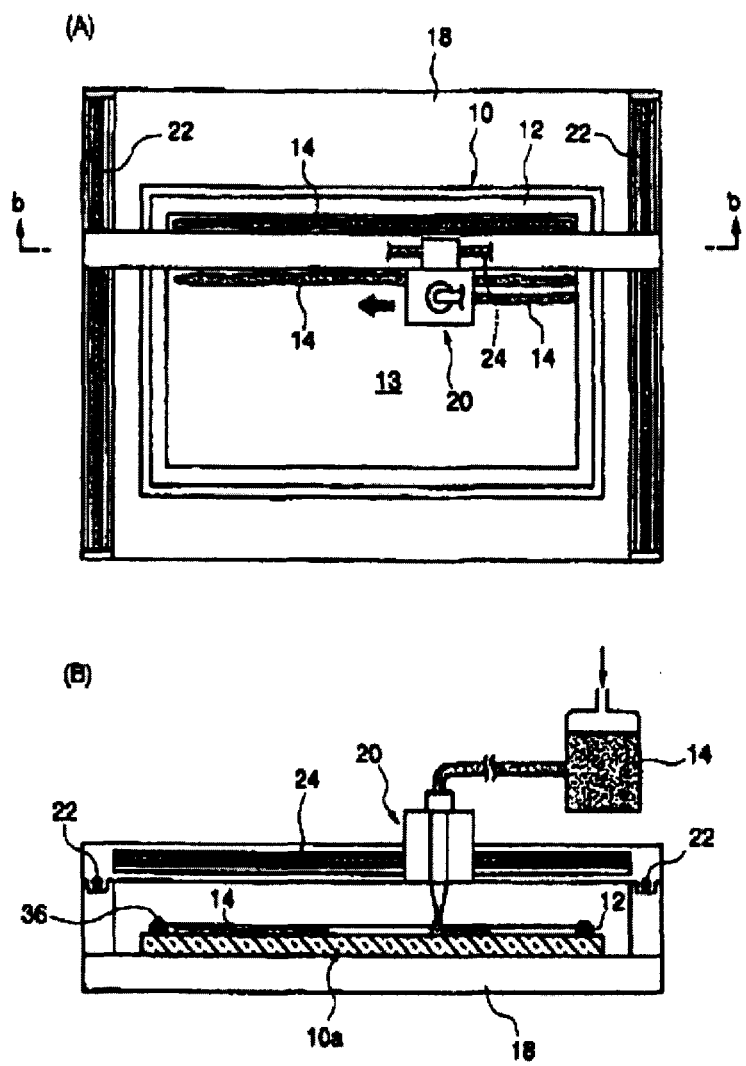
FIG. 2 is views illustrating a coating step in one embodiment of the production process of the present invention.

Then, as shown in FIG. 2, the curable resin composition 14 is supplied to a rectangular area 13 surrounded by the sealing member 12 on the transparent substrate 10a. The amount of the curable resin composition 14 to be supplied is set to be an amount such that a sealed space which is surrounded by the sealing member 12 and the pair of the transparent substrates 10a and 10b, to be formed in a subsequent step, is filled with a cured product of the curable resin composition 14. At that time, a volume of the sealed space is calculated on the assumption that deformation such as sag due to its own weight of the transparent substrate does not occur.

The means of supplying the curable resin composition 14 may be coating or dropping. In this embodiment, the transparent substrate 10a is flatly placed on a lower surface plate 18, and the curable resin composition 14 is applied in a linear form, a belt form or a dot form by using a dispenser 20 movable in the horizontal direction. The dispenser 20 is movable horizontally within the entire region of the area 13 by a known horizontal moving mechanism comprising a pair of lead screws 22 and 22 and a lead screw 24 perpendicular to the pair of the lead screws 22 and 22. Here, instead of the dispenser 20, a die-coating means may also be employed.

Further, it is not essential, but in this embodiment, a curable resin 36 for sealing is applied on the upper surface of the sealing member 12. The curable resin 36 for sealing may be the same as the curable resin composition 14 of the present invention, or may be a different curable resin. The curable resin is preferably a ultraviolet ray-curable resin. When the curable resin composition 14 of the present invention is a thermosetting curable resin composition, the curable resin for sealing may also be a thermosetting resin.

Figure 3:
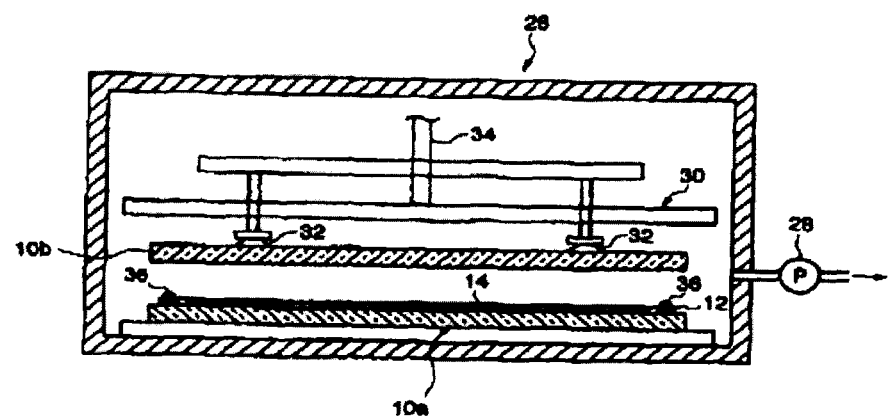
FIG. 3 is a view illustrating a step of forming a sealed space in one embodiment of the production process of the present invention.

Thus, the one transparent substrate 10a coated with the curable resin composition 14 and the other transparent substrate 10b are accommodated in a reduced pressure chamber 26 as shown in FIG. 3. In the reduced pressure chamber 26, the one transparent substrate 10a is kept horizontally so that the surface coated with the curable resin composition 14 is to be upper surface. The other transparent substrate 10b is kept to be horizontally sucked, above the one transparent substrate 10a, by suction pads 32, 32 . . . of an upper surface plate 30. The suction pad may be an adhesion pad using an adhesion material. The upper surface plate 30 can be driven up and down by an air cylinder 34. The number of the suction pads 32 and the position to be mounted to the upper surface plate 30 can properly be changed depending upon e.g. a size of the transparent substrate 10b.

Then, the reduced pressure chamber 26 is evacuated of air by a vacuum pump 28 to being a reduced pressure atmosphere (first atmosphere) in the reduced pressure chamber 26. The pressure of the reduced pressure atmosphere (first atmosphere) is preferably at most 1 kPa, more preferably from 10 to 100 Pa, furthermore preferably from 30 to 50 Pa. When the pressure of the first atmosphere is at most 1 kPa, it is easy to prevent the bubbles from remaining in the curable resin composition 14. If the pressure is less than 10 Pa, the degree of vacuum is so high that time loss to constitute the vacuum environment becomes large. Further, if the degree of vacuum is too high, there may be harmful influences such that additives such as a heat polymerization initiator (or a photopolymerization initiator), a polymerization inhibitor and a light stabilizer contained in the curable resin composition 14 are partly evaporated.

In such a state, by operating the air cylinder 34 to let the other transparent substrate 10b down so as to be overlaid on the one transparent substrate 10a. That is, the other transparent substrate 10b is pushed toward the upper surface of the one transparent substrate 10a to expand the curable resin composition on the transparent substrate 10a so as to overlay them.

Further, they are left to stand for a prescribed time under a pressure of the reduced pressure atmosphere (first atmosphere) to form a sealed space having the curable resin composition 14 interposed in a space between the two transparent substrates 10a and 10b. That is, they are in such a state (an uncured laminate) that the pair of the transparent substrates 10a and 10b are laminated via the sealing member 12 and the curable resin 36 for sealing, to form a sealed space surrounded by the sealing member 12 and the pair of the transparent substrates 10a and 10b. In this sealed space, the curable resin composition 14 is accommodated, and a portion other than the curable resin composition 14 in the sealed space is in the same reduced pressure state (vacuum state) as in the first atmosphere.

Then, the interior of the reduced pressure chamber 26 is made to be a second atmosphere having a pressure higher than the above first atmosphere. The pressure of the second atmosphere is preferably at least 10 kPa, more preferably at least 100 kPa. Further, the difference between the pressure of the first atmosphere and the pressure of the second atmosphere is preferably at least 50 kPa, more preferably at least 100 kPa. The pressure of the second atmosphere is most preferably an atmospheric pressure. For example, the interior of the vacuum chamber 26 is exposed to atmospheric pressure. When the pressure of the second atmosphere is an atmospheric pressure, an equipment for keeping a specific pressure is unnecessary. In such a manner, outside of the sealed space surrounded by the sealing member 12 and the pair of the transparent substrates 10a and 10b is made to be the second atmosphere having a pressure higher than the first atmosphere, whereby the pair of the transparent substrates 10a and 10b are pushed towards the direction that they are adhered with each other by the pressure difference between outside and inside of the sealed space. Accordingly, the curable resin composition 14 flows into a portion other than the curable resin composition 14 in the sealed space, whereby the entire sealed space is uniformly filled with the curable resin composition 14.

Then, the curable resin 36 for sealing and the curable resin composition 14 are cured to obtain a transparent laminate having the pair of the transparent substrates 10a and 10b integrated via an adhesive layer made of a cured product of the curable resin composition 14.

Figure 4:
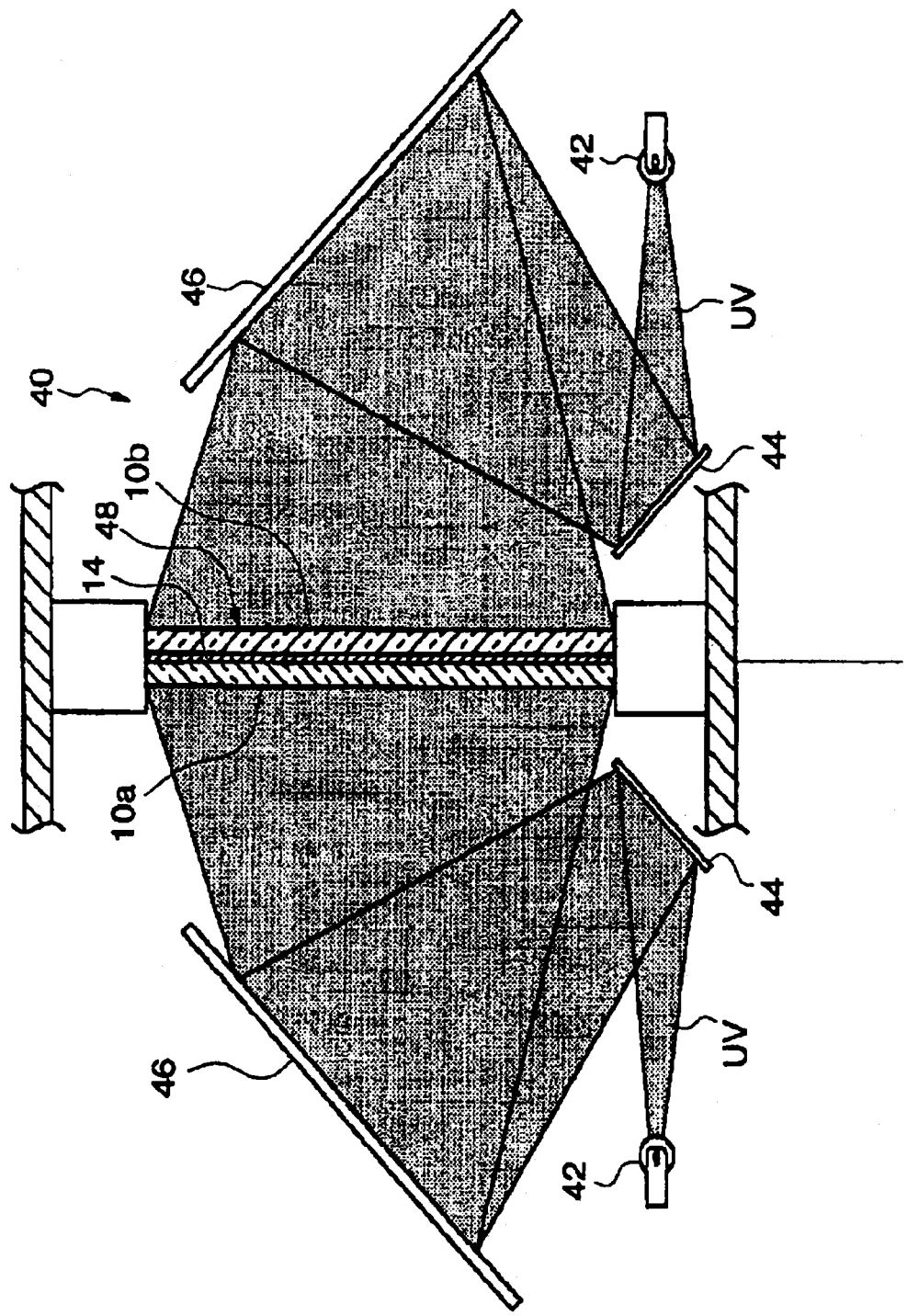
FIG. 4 is a view illustrating a curing step by light irradiation in one embodiment of the production process of the present invention.

For example, in a case where the curable resin 36 for sealing and the curable resin composition 14 in the sealed space are a ultraviolet curable resin composition, they may be cured by using a UV irradiation apparatus 40 shown in FIG. 4.

The UV irradiation apparatus 40 is composed so as to irradiate the entire surface of both surfaces of the uncured laminate 48 with ultraviolet rays UV discharged from high pressure mercury lamps 42 and 42 via reflective mirrors 44, 44, 46 and 46. By using such an apparatus, it is possible to cure the curable resin 36 applied on the upper surface of the sealing member 12 and the curable resin composition 14 in the sealed space at the same time. As a ultraviolet light source, it is also possible to use a plurality of e.g. chemical lamps or black lights disposed therein, as a more simple means. Further, in a case where the curable resin composition 14 is a thermosetting curable resin composition, heat may be added to cure it.

In the above embodiment, the curable resin 36 for sealing is not essential, but when the curable resin 36 for sealing is applied on the double sided adhesive tape 12, the adhesion is improved and the air-tightness of the sealed space is improved, and such is preferred with a view to maintaining the reduced pressure degree (degree of vacuum) in the sealed space when it is exposed to atmospheric pressure. Further, at the time of facing and bonding the pair of the transparent substrates under reduced pressure, the distance between the transparent substrates can be made longer by the coating thickness of the curable resin 36 for sealing, whereby it is possible to prevent the curable resin composition 14 supplied into the seal from locally leaking from the seal at the time of bonding the pair of the transparent substrates.

After exposing it to atmospheric pressure, the curable resin 36 for sealing is expanded on the seal by the pressure difference and the coating thickness becomes sufficiently small, whereby the volume change in the prescribed sealed space is hardly problematic. Further, instead of the double sided adhesive tape, it is also possible to apply a highly viscous curable resin for sealing other than the curable resin composition 14, as a sealing member. In the highly viscous curable resin for sealing, spacer particles may be blended so as to maintain a prescribed seal thickness. By using, as a sealing member, the highly viscous curable resin for sealing, it is possible to hold the curable resin composition 14 supplied to the area surrounded by the sealing member, in the surface of the transparent substrate. Further, by adjusting the amount of the curable resin composition 14 to be supplied, it is possible to adjust the thickness of the resin cured product between the pair of the transparent substrates after cured.

<Transparent Substrate>

The transparent substrates 10a and 10b are not particularly limited, and they may be an inorganic transparent substrate such as glass or a resin-made transparent substrate.

Such a transparent substrate is preferably made of glass or a resin. In the case of a glass plate, a laminated glass is obtained. When a polycarbonate is used as a resin plate, it is possible to provide a transparent panel having a high shock resistance and being light in weight. Further, a glass plate and a resin plate may be bonded by means of the curable resin composition. The size of the transparent substrate is not particularly limited, but in the case of a transparent substrate with a size having at least one side being 300 mm or longer, preferably 600 mm or longer, it is possible to provide a transparent panel which is widely useful as a transparent member to be disposed in opening portions for construction or vehicles. The size of the transparent substrate is suitably at most 4 $m^2$ in usual applications. The shape of the transparent substrate is not particularly limited, and may, for example, be rectangle.

On the surface to be in contact with the curable resin composition 14, of at least one of the pair of the transparent substrates 10a and 10b, it is preferred to dispose a surface-treated layer obtained by treating the surface of the transparent substrate with a surface treatment agent having a functional group capable of chemically bonding with the curable resin composition 14 at the time curing the curable resin composition 14, whereby the adhesion between the transparent substrate and the adhesive layer made of a cured product of the curable resin composition 14 is improved, and the mechanical strength of the laminate is improved. Therefore, it is suitable for a laminated glass which requires high strength. As the surface treatment agent, a known titanium compound or a silane compound can be used.

As the silane compound, a silane coupling agent such as 3-methacryloxypropyl trimethoxysilane may, for example, be mentioned. In the case of using the silane compound, as one example of a specific method for use, first, a solution of the silane compound:water:iPA (isopropyl alcohol)=0.3:0.5:99.2 is stirred for 10 hours at room temperature to obtain a solution in which the silane coupling agent is hydrolyzed so as to be wholly or partly changed to a silanol. Then, the transparent substrate is immersed in the solution for 1 minute and then taken out, and thereafter the transparent substrate is subjected to heat treatment in an oven at 150° C. for 30 minutes so that the glass surface is reacted.

Further, the pair of the transparent substrates 10a and 10b may be curved substrates having approximately the same curvature. For example, in a case where a pair of transparent substrates 10a and 10b are integrated via an intermediate layer formed in a film shape, a wrinkle may be formed in the film when the transparent substrates are curved substrates having a large curvature, and therefore it is difficult to produce a laminate. On the other hand, in the vacuum lamination method of the present invention, an adhesive layer is formed so as to follow the shape of the transparent substrate, therefore the shape of the transparent substrate is not limited, and it is also possible to use a three-dimensionally curved transparent substrate having a relatively large curvature.

<Transparent Laminate>

According to the present invention, it is possible to obtain a transparent laminate having a pair of transparent substrates integrated via an adhesive layer made of a cured product of the curable resin composition of the present invention. The thickness of the adhesive layer is preferably from 0.2 to 4.0 mm, more preferably from 0.3 to 2.5 mm. When the thickness of the adhesive layer is at least 0.2 mm, the good mechanical strength of the laminate can readily be obtained. Further, according to the present invention, it is possible to suppress non-uniformity in the curing reaction, and accordingly even when the adhesive layer is so thick as about 4.0 mm, it is possible to suppress distortion of the transmitted light, caused by non-uniformity of the refractive index of the cured product, and therefore a laminate having a good adhesion to the transparent substrate can be obtained.

Further, the cured product of the curable resin composition is excellent in the transparency, and it is thereby possible to obtain a transparent laminate excellent in the transparency, with a haze of at most 6%, preferably at most 1%.

Further, where the thickness of the adhesive layer is Ts, the thickness of the thinner one between the pair of the transparent substrates 10a and 10b is T1 and the thickness of the thicker one is T2, it is preferred that the thickness Ts of the adhesive layer satisfies the following formula (2). Here, the thicknesses T1 and T2 may be the same.

$$T1 \times 0.05 \leq Ts \leq T2 \times 1.5 \qquad (2)$$

That is, when the thickness Ts of the adhesive layer is at least 5% of the thickness of the thinner one between the pair of the transparent substrates, the strength as the laminate can readily be secured, and if it exceeds 150% of the thickness of the thicker one between the transparent substrates, the laminate becomes unnecessarily thick.

When the curable resin composition of the present invention is used for the adhesive layer of the laminate, it is possible to obtain such good optical properties as a small haze value or optical distortion even when the adhesive layer is relatively thick. It is considered that this is because the curing rate is properly adjusted in the step of curing reaction by the use of the specific component (a) and the component (b) in combination as a curable oligomer and a low-molecular weight curable component, and also because the molecular structure of the component (b) not only gives a uniform cured product depending upon the size of its hydroxy group and alkyl group, but also properly contributes to the improvement of the adhesion to the substrate.

Therefore, when the curable resin composition of the present invention is used for the adhesive layer of the transparent substrate, the adhesive layer shows not only high mechanical strength and good adhesion to the substrate but also good transparency, and therefore it is possible to obtain a transparent laminate having high impact resistance, good optical quality and excellent safety.

Further, the curable resin composition of the present invention can suitably be applied to the vacuum lamination method to produce a transparent laminate. In the case of the vacuum lamination method, since a pair of transparent substrates are adhered to each other in an atmosphere under vacuum, bubbles are unlikely to be formed in the adhesive layer. Accordingly, a step for removing such bubbles is unnecessary, and therefore it is possible to produce the transparent laminate in good productivity.

Further, in the vacuum lamination method, it is possible to use, as a curable resin composition, a relatively high viscous composition or a high-molecular weight composition, whereby a cured product having a high strength can be obtained when cured, and it is thereby possible to obtain a transparent laminate having high mechanical strength as a whole. Accordingly, even when the adhesive layer is thin, it is possible to achieve a sufficient mechanical strength of the transparent laminate.

EXAMPLES

Now, the present invention will be describe in further detail with reference to Examples, but it should be understood that the present invention is not limited to these Examples.

Examples 1 to 16

A curable resin composition was prepared by mixing the respective components in a blend amount shown in Table 1. The unit of the blend amount in Table 1 is part by mass.

Further, the viscosities at 25° C. and 40° C., of some of the curable resin composition obtained, were respectively measured. The results are shown in Table 1. The symbol "–" in the columns of "Viscosity of uncured product" in Table 1 shows that no measurement was conducted. However, the viscosity of the composition is almost determined by the viscosity of the component (a) and its proportion to the other reactive components, and therefore the viscosities of the compositions in Example 2 and 3 are almost the same as the viscosity of the composition in Example 4, and the viscosities of the compositions in Example 10, 12, 13 and 14 are almost the same as the viscosities of the composition in Example 11. This is confirmed by handling of the curable resin composition in the production of the laminate in each Example.

The respective components shown in Table 1 are as follows:

Urethane acrylate 1: A urethane oligomer (product name "EB230", manufactured by DAICEL-CYTEC Company, LTD.) having an acryloyl group. Number of functional groups: 2, measurement value of number average molecular weight: about 7,700, measurement value of viscosity at 40° C.: about 13.4 Pa·s. Urethane acrylate 1 is regarded as a reaction product of a polypropylene glycol having a number average molecular weight of about 3,000, an isophorone diisocyanate and 2-hydroxyethyl acrylate.

Urethane acrylate 2: A urethane curable oligomer (product name "U-200AX", manufactured by Shin-Nakamura Chemical Co., Ltd.) having an acryloyl group. Number of functional groups: 2, measurement value of number average molecular weight: about 5,100, measurement value of viscosity at 40° C.: about 79.6 Pa·s. Urethane acrylate 2 is regarded as a reaction product of an aliphatic polyester diol having a number average molecular weight of about 8,000, an aliphatic (or alicyclic) diisocyanate and 2-hydroxyethyl acrylate.

Urethane acrylate 3: Urethane oligomer obtained in such a manner that a polypropylene glycol having a number average molecular weight of about 2,000 as calculated from a hydroxy value and isophorone diisocyanate were mixed in a molar ratio of approximately 1:2, and reacted in the presence of a catalyst of a tin compound to obtain a prepolymer, to which 2-hydroxyethyl acrylate was added in a molar ratio of approximately 1:2 for reaction. Number of functional groups: 2, measurement value of number average molecular weight: about 6,000, measurement value of viscosity at 40° C.: about 10.5 Pa·s.

Urethane acrylate 4: Urethane oligomer obtained in such a manner that a polypropylene glycol having a number average molecular weight of about 5,600 as calculated from a hydroxy value and isophorone diisocyanate were mixed in a molar ratio of approximately 1:2 and reacted in the presence of a catalyst of a tin compound to obtain a prepolymer, to which 2-hydroxyethyl acrylate was added in a molar ratio of approximately 1:2 for reaction. Number of functional groups: 2, measurement value of number average molecular weight: about 14,000, measurement value of viscosity at 40° C.: about 14.7 Pa·s.

Urethane methacrylate: A urethane curable oligomer (product name "UA-4000", manufactured by Shin-Nakamura Chemical Co., Ltd.) having a methacryloyl group. Number of functional groups: 2, measurement value of number average molecular weight: about 5,300, measurement value of viscosity at 40° C.: about 0.71 Pa·s. Urethane methacrylate is regarded as a reaction product of a polypropylene glycol having a number average molecular weight of about 4,000, an aliphatic (or alicyclic) diisocyanate and 2-hydroxyethyl methacrylate.

Polyether diacrylate: Product name "APG-700, manufactured by Shin-Nakamura Chemical Co., Ltd. Number of functional groups: 2, measurement value of number average molecular weight: about 1,000, measurement value of viscosity at 40° C.: about 0.04 Pa·s. Polyether diacrylate is regarded as a diacrylate of a polypropylene glycol having a number average molecular weight of about 700.

Epoxy diacrylate: Product name "EA-5520", manufactured by Shin-Nakamura Chemical Co., Ltd. Number of functional groups: 2, measurement value of viscosity at 40° C.: about 0.25 Pa·s. Epoxy diacrylate is regarded as an adduct of 1,6-diglycidyloxyhexane with 2 mol of acrylic acid.

2-Hydroxybutyl methacrylate

2-Hydroxyethyl methacrylate $CH_2=C(CH_3)CO(OC_2H_4)_n-OH: n \approx 2$ (product name "PE-90", manufactured by NOF Corporation).

$CH_2=C(CH_3)CO(OC_3H_6)_n-OH: n \approx 4$ to 6 (product name "AE-90", manufactured by NOF Corporation).

n-Dodecyl methacrylate n-Octadecyl methacrylate

4-Hydroxybutyl acrylate

Polymerization initiator 1: Benzoin isopropyl ether

Polymerization initiator 2: 1-Hydroxy-cyclohexyl-phenyl-ketone (product name "IRGACURE 184", manufactured by Ciba Specialty Chemicals).

Polymerization initiator 3: 1-[4-(2-Hydroxyethoxy)-phenyl]-2-hydroxy-2-methyl-1-propan-1-one (product name "IRGACURE 2959", manufactured by Ciba Specialty Chemicals).

Polymerization initiator 4: bis(2,4,6-Trimethylbenzoyl)-phenylphosphine oxide (product name: "IRGACURE 819", manufactured by Ciba Specialty Chemicals).

[Production of Laminate]

Laminated glasses (transparent laminates) were produced by using the respective curable resin compositions obtained in Examples 1 to 16. Each curable resin composition was accommodated in a reduced pressure chamber in an open state while it was kept in a container, and the interior of the chamber was evacuated to about 200 Pa and held for 10 minutes to carry out bubble-removal treatment, before use.

First, a pair of soda lime glasses (transparent substrates) with a length of 610 mm, a width of 610 mm and a thickness of 2 mm were prepared. A double sided adhesive tape (sealing member 12) with a thickness of 1 mm and a width of 10 mm was adhered along edge portions of four sides of one soda lime glass (transparent substrate 10a), and then a release film on the upper surface of the double sided adhesive tape was removed.

An ultraviolet curable resin 36 for sealing prepared by uniformly mixing 100 parts by mass of a urethane acrylate oligomer (product name "UF8001G", manufactured by Kyoeisha Chemical Co., Ltd.) and 1 part by mass of benzoin isopropyl ether (polymerization initiator) in advance, was applied on the upper surface of the above double sided adhesive tape by a dispenser in a coating thickness of about 0.3 mm.

Then, regarding a curable resin composition 14 (Examples 1 to 4, 6 to 8 and 10 to 14), in an area surrounded by the double sided adhesive tape, on the surface of the transparent substrate 10a to which the double sided adhesive tape was adhered, the curable resin composition 14 was supplied to a plurality of potions by using a dispenser so that the total weight would be 380 g. Then, the transparent substrate 10a was placed horizontally in a vacuum chamber as shown in FIG. 3.

Then, the other soda lime glass (transparent substrate 10b) was held on an upper surface plate 30 in the vacuum chamber by using suction pads 32, 32 . . . , and held so as to face the transparent substrate 10a in parallel, and so that the distance from the transparent substrate 10a would be 10 mm.

Then, the vacuum chamber was closed and the interior of the chamber was evacuated to about 30 Pa. At that time, the bubbling of the composition dropped was not continued. Thereafter, the upper and lower surface plates were moved closer by an elevating device, and the transparent substrate 10a and the transparent substrate 10b were press-bonded under a pressure of 2 kPa and held for 1 minute. Thereafter, the interior of the vacuum chamber was returned to atmospheric pressure in about 30 seconds thereby to obtain a precursor of a transparent laminate having the transparent substrate 10a and the transparent substrate 10b bonded via an uncured layer of the curable resin composition 14.

Then, the upper and lower surface plates were moved away from each other by the elevating device, and the precursor of the transparent laminate sucked by the suction pads 32, 32 . . . of the upper surface plate on the upper side, was released from the upper surface plate 30 on the upper side. Thereafter, a portion where the double sided tape was present along the periphery of the precursor of the transparent laminate was irradiated with UV rays emitted from a fiber light source using a high pressure mercury lamp as the light source through the other transparent substrate 10b, to cure the ultraviolet curable resin 36 for sealing. Thereafter, the precursor of the transparent laminate was kept horizontally and left to stand for about one hour.

Meanwhile, in the case of a curable resin composition having $V_{25}$ of at most 0.10 Pa·s, the composition is likely to leak from the sealed portion when the interior of the vacuum chamber is returned to atmospheric pressure, and therefore it was difficult to apply the above vacuum lamination method (further, in the case of a curable resin composition having $V_{25}$ of at least 0.15 Pa·s, bubbles could hardly be removed from the curable resin composition injected, and therefore the following injection filling method could not be used). Accordingly, regarding the curable resin composition 14 (Examples 5, 9, 15 and 16) having $V_{25}$ being smaller than 0.15 Pa·s, a pair of transparent substrates were previously bonded with each other via the double sided adhesive tape adhered to their peripheries, a part of the seal on the upper sides was peeled to form an opening portion, and from the opening, a prescribed amount of the curable composition 14 was injected between the transparent substrates by using a injection cylinder. Then, the assembly was vertically left to stand for a long time to gather the included bubbles to the upper side of the seal, and the injection port was bonded and sealed again via the seal of the double sided tape so as to push out the bubbles gathered in the upper portion. Thereafter, the precursor of the transparent laminate was kept horizontally and left to stand for about 24 hours.

Then, from directions of both sides of the precursor of the transparent laminate, ultraviolet rays having an intensity of 1 $mW/cm^2$ were respectively applied for 10 minutes uniformly by means of high pressure mercury lamps to cure the curable resin composition 14 thereby to obtain a transparent laminate (laminated glass). The thickness of the adhesive layer of the transparent laminate obtained was about 0.8 mm in each Example. Further, in each of Examples 2, 3, 4, 5 and 7, chemical lamps were used instead of the high pressure mercury lamps, and ultraviolet rays were applied under the same conditions as the above.

[Evaluations]

(Haze Value)

As an evaluation of the transparency in the portion where the adhesive layer of the transparent laminate obtained was present, a haze value was measured. The haze value was measured in accordance with ASTM D 1003, by using Hazegard II, manufactured by Toyo-Seiki Seisaku-sho LTD. The results are shown in Table 1.

(Adhesion)

Operation was carried out in such a manner that only a part of the one transparent substrate 10a in the transparent laminate was removed to expose the adhesive layer (cured product), and the adhesive layer was peeled off from the other transparent substrate 10b, and the adhesion was evaluated on the basis of the following standards. The results are shown in Table 1.

◯: The adhesive layer was substantially deformed when delaminated.

Δ: The adhesive layer was somewhat deformed when delaminated.

x: The adhesive layer was hardly deformed when delaminated.

(Tear Strength)

Only a part of the one transparent substrate 10a in the transparent laminate was removed to expose the adhesive layer (cured product), and a part (a size of approximately 1 cm×2 cm) of the adhesive layer (cured product) was peeled off from the other transparent substrate 10b to prepare a test specimen. The test specimen was torn from an about 1 mm-cut line imparted at an almost center portion of the longer side of the test specimen obtained, and the tear strength was evaluated on the basis of the following standards. The results are shown in Table 1.

◯: The adhesive layer was substantially deformed and elongated when torn.

Δ: The adhesive layer was deformed but not elongated so much when torn.

x: The adhesive layer was hardly deformed but easily ruptured when torn.

(Falling Ball Test)

The laminate obtained in each of Examples 1 and 2 was subjected to a falling ball test. In this test, the laminate was placed on a test frame in accordance with JIS R3205, and an iron ball with a weight of 4.11 kg was fallen to the center of the laminate from a height of 1.5 m. The test was conducted in an atmosphere where the temperature was controlled to 23±2° C.

As a result of the test, the iron ball did not penetrate the laminate in both of Examples 1 and 2. Subsequently, the iron ball was fallen from the same height to the same test body twice, but no penetration was observed.

TABLE 1

| | | 1 | 2 | 3 | 4 | 5 | 6 | 7 | 8 | 9 |
|---|---|---|---|---|---|---|---|---|---|---|
| Component (a) | Urethane acrylate 1 | 60 | 50 | 50 | 50 | 20 | | | | |
| | Urethane acrylate 2 | | | | | | 60 | | | |
| | Urethane acrylate 3 | | | | | | | 40 | | |
| | Urethane acrylate 4 | | | | | | | | 30 | |
| | Urethane methacrylate | | | | | | | | | 30 |
| Comparative Component (a') | Polyether diacrylate | | | | | | | | | |
| | Epoxy diacrylate | | | | | | | | | |
| Component (b) | 2-Hydroxybutyl methacrylate | 40 | 40 | 40 | 40 | 40 | 40 | 40 | 30 | 40 |
| Comparative Component (b') | 2-Hydroxyethyl methacrylate | | | | | | | | | |
| | $CH_2=C(CH_3)CO-(OCH_2CH_2)_n-OH$ | | | | | | | | | |
| | $CH_2=C(CH_3)CO-(OC_3H_6)_n-OH$ | | | | | | | | | |
| Component (c) | n-Dodecyl methacrylate | | 8 | 10 | 8 | | | | | 28 |
| | n-Octadecyl methacrylate | | | | | 40 | | 20 | 40 | |
| Component (d) | 4-Hydroxybutyl acrylate | | 2 | | 2 | | | | | 2 |
| Polymerization initiator | Polymerization initiator 1 | 3 | 3 | | | | 3 | | | |
| | Polymerization initiator 2 | | | | 1 | | | | | |
| | Polymerization initiator 3 | | | | | 1 | | | | 1 |
| | Polymerization initiator 4 | | | | | | | 0.1 | 0.1 | 0.1 |
| Viscosity of uncured product | Viscosity at 25° C. (Pa·s) | 1.4 | — | — | 0.62 | 0.08 | 2.3 | 0.16 | 0.17 | 0.10 |
| | Viscosity at 40° C. (Pa·s) | 0.59 | — | — | 0.28 | — | — | — | — | — |
| Evaluation | Haze value | At most 1% | At most 1% | At most 1% | At most 1% | At most 1% | At most 1% | At most 1% | At most 1% | At most 1% |
| | Adhesion | ◯ | ◯ | ◯ | ◯ | ◯ | Δ | ◯ | ◯ | ◯ |
| | Tear strength | ◯ | ◯ | ◯ | ◯ | ◯ | ◯ | ◯ | ◯ | Δ |

| | | 10 | 11 | 12 | 13 | 14 | 15 | 16 |
|---|---|---|---|---|---|---|---|---|
| Component (a) | Urethane acrylate 1 | 60 | 60 | 60 | 60 | 60 | | |
| | Urethane acrylate 2 | | | | | | | |
| | Urethane acrylate 3 | | | | | | | |
| | Urethane acrylate 4 | | | | | | | |
| | Urethane methacrylate | | | | | | | |

TABLE 1-continued

| | | | | | | | | | |
|---|---|---|---|---|---|---|---|---|---|
| Comparative Component (a') | Polyether diacrylate | | | | | | | 60 | |
| | Epoxy diacrylate | | | | | | | | 60 |
| Component (b) | 2-Hydroxybutyl methacrylate | | | | | | | 40 | 40 |
| Comparative Component (b') | 2-Hydroxyethyl methacrylate | | | 40 | | | | | |
| | CH$_2$=C(CH$_3$)CO—(OCH$_2$CH$_2$)$_n$—OH | | | | 40 | | | | |
| | CH$_2$=C(CH$_3$)CO—(OC$_3$H$_6$)$_n$—OH | | | | | 40 | | | |
| Component (c) | n-Dodecyl methacrylate | 40 | | | | | | | |
| | n-Octadecyl methacrylate | | | | | | | | |
| Component (d) | 4-Hydroxybutyl acrylate | | | 40 | | | | | |
| Polymerization initiator | Polymerization initiator 1 | 1 | 3 | 3 | 3 | 3 | 3 | 3 |
| | Polymerization initiator 2 | | | | | | | | |
| | Polymerization initiator 3 | | | | | | | | |
| | Polymerization initiator 4 | | | | | | | | |
| Viscosity of uncured product | Viscosity at 25° C. (Pa·s) | — | 1.2 | — | — | — | 0.03 | 0.04 |
| | Viscosity at 40° C. (Pa·s) | — | 0.53 | — | — | — | — | — |
| Evaluation | Haze value | At most 1% | At most 1% | 5.1% white turbidity | 6.9% white turbidity | At most 1% | At most 1% | At most 1% |
| | Adhesion | X | X | ○ | X | X | X | X |
| | Tear strength | X | X | ○ | X | X | X | X |

As shown in the results in Table 1, in the transparent laminate in each of Examples 1 to 9 of the present invention, the haze is low and the transparency is excellent, and the adhesion to the substrate and the tear resistance are also good. On the other hand, in the transparent substrate in each of Examples 10 and 11 in which no component (b) is contained, the adhesion and the tear resistance were poor.

In the transparent laminate in Example 12 in which a hydroxyalkyl methacrylate having a hydroxyalkyl group with one hydroxy group and two carbon atoms was used instead of the component (b), the adhesion and the tear resistance were good, but white turbidity occurred.

In the transparent laminate in each of Examples 13 and 14 in which a methacrylate having a hydroxy group and a polyoxyalkylene chain was used instead of the component (b), the adhesion and the tear resistance were poor.

In the transparent laminate in each of Examples 15 and 16 in which the component (a) was changed to another acryl type oligomer, the adhesion and the tear resistance were poor.

Example 17

By using the following raw material components, a laminate was produced and evaluated in the same manner as in Examples 1 to 16.

Urethane acrylate 5: A urethane oligomer obtained in such a manner that poly(oxypropylene/oxyethylene)diol having an oxyethylene group at its terminal, having a number average molecular weight of about 4,000 as calculated from a hydroxy value, and isophorone diisocyanate were mixed in a molar ratio of approximately 3:4 and reacted in the presence of a catalyst of a tin compound to obtain a prepolymer, to which 2-hydroxyethyl acrylate was added in a molar ratio of about 1:2 for reaction. Number of functional groups: 2, measurement value of number average molecular weight: about 21,000, measurement value of viscosity at 40° C.: about 93 Pa·s (measurement results obtained by means of the above viscometer manufactured by Brookfield Engineering). However, this viscosity exceeds a standard measurement value of the viscometer manufactured by Brookfield Engineering, and therefore the viscosity was again measured by using a rotation viscometer RE-85U, manufactured by TOKI SANGYO CO., LTD. As a result, the viscosity at 40° C. was about 90 Pa·s.

Polymerization initiator 4: bis(2,4,6-Trimethylbenzoyl)-phenylphosphine oxide (product name "IRGACURE 819", manufactured by Ciba Specialty Chemicals).

Polymerization inhibitor 1: 2,6-di-t-Butyl-hydroquinone.

Ultraviolet absorber 1: Mixture of octyl-3-[3-t-butyl-4-hydroxy-5-(5-chloro-2H-benzotriazol-2-yl)phenyl]propionate and 2-ethylhexyl-3-[3-t-butyl-4-hydroxy-5-(5-chloro-2H-benzotriazol-2-yl)phenyl]propionate (product name "TINUVIN 109", manufactured by Ciba Specialty Chemicals).

To a mixture having the above urethane acrylate 5, 2-hydroxybutyl methacrylate and n-dodecyl methacrylate mixed in a mass ratio of 40/40/20, 0.1 mass % of the polymerization initiator 4, 0.02 mass % of the polymerization inhibitor 1 and 0.3 mass % of the ultraviolet absorber 1 were blended to produce a curable resin composition (hereinafter referred to as "composition L"). The viscosity (a measurement result obtained by the above viscometer manufactured by Brookfield Engineering) of this composition L was 1.1 Pa·s at 25° C. and 0.57 Pa·s at 40° C.

In the same manner as in the above Examples 1 to 4, 6 to 8 and 10 to 14, a laminate was produced by using a chemical lamp as a light source for ultraviolet curing by means of the above vacuum lamination method, and the laminate thus obtained was evaluated in the same manner as the above. As a result, the haze value was at most 1%, the adhesion became ○, and the tear strength became ○.

Example 18

By using the following raw material components, a laminate was produced and evaluated in the same manner as in Example 17.

To the composition L produced in the above Example 17, as a chain transfer agent for the curing reaction, 1,4-bis(3-mercaptobutyryloxy)butane (tradename "Karenz MT BD1", manufactured by Showa Denko K.K.) was blended in an amount of 0.5 mass % to the composition L, to produce a curable resin composition (hereinafter referred to as "composition M"). Since the amount of the chain transfer agent added was such a trace amount, the viscosity measurement of the composition M was not carried out (its viscosity is regarded as the same as in the above composition L). In the same manner as in the above Example 17, by employing the above vacuum lamination method, a laminate was produced by using a chemical lamp, and the laminate obtained was evaluated in the same manner as in the above. As a result, the haze value was at most 1%, the adhesion was ◯, and the tear strength was ◯. When the test specimen after the tearing test was observed, it was found to be a cured product with more flexibility than the cured product obtained in the above Example 17.

Example 19

By using the following raw material components, a laminate was produced and evaluated in the same manner as in Examples 17 and 18.

Urethane acrylate 6: A urethane oligomer obtained in such a manner that the same poly(oxypropylene/oxyethylene)diol used for urethane acrylate 5 and hexamethylene diisocyanate were mixed in a molar ratio of approximately 5:6 and reacted in the presence of a catalyst of a tin compound to obtain a prepolymer, to which 2-hydroxyethyl acrylate was added in a molar ratio of approximately 1:2 for reaction. Number of functional groups: 2, measurement value of number average molecular weight: about 45,000, and measurement value of viscosity at 50° C.: about 2,500 Pa·s (by using the above rotation viscometer RE-85U manufactured by TOKI SANGYO CO., LTD., a measurement temperature was set to be 50° C. so that the viscosity measurement value would be within the measurement standard value).

Polymerization initiator 4, polymerization inhibitor 1 and ultraviolet absorber 1 are ones described in Example 17.

To a mixture having the above urethane acrylate 6, 2-hydroxybutyl methacrylate and n-octadecyl methacrylate mixed in a mass ratio of 40/40/20, 0.1 mass % of the polymerization initiator 4, 0.02 mass % of the polymerization inhibitor 1 and 0.3 mass % of the ultraviolet absorber 1 were blended to produce a curable resin composition (hereinafter referred to as "composition N"). The viscosities (measurement results obtained by means of the above viscometer manufactured by Brookfield Engineering) of the composition N were 22 Pa·s at 25° C. and 10 Pa·s at 40° C.

In the same manner as in the above Examples 17 and 18, by employing the vacuum lamination method, a laminate was produced by using a chemical lamp as a light source for ultraviolet curing, and the laminate obtained was evaluated in the same manner as in the above. As a result, the haze value was at most 1%, the adhesion was ◯, and the tear strength was ◯.

INDUSTRIAL APPLICABILITY

A transparent laminate produced by using the curable resin composition of the present invention is especially useful for e.g. windshield glass for automobiles and window glass (safety glass or security glass) for buildings, since the adhesive layer has good tear resistance, good adhesion to transparent substrates and excellent transparency.

The entire disclosure of Japanese Patent Application No. 2007-197571 filed on Jul. 30, 2007 including specification, claims, drawings and summary is incorporated herein by reference in its entirety.

What is claimed is:

1. A process for producing a transparent laminate comprising:
    curing a curable resin composition sandwiched between a pair of transparent substrates, wherein the curable resin composition comprises a urethane oligomer (a) which is a reaction product of a polyoxyalkylene polyol (i) having from 1.8 to 4 hydroxy groups on average per molecule, wherein the number average molecular weight of the polyoxyalkylene polyol per hydroxyl group is from 400 to 8,000, an aliphatic or alicyclic diisocyanate (ii), and a $C_{2-6}$ hydroxyalkyl acrylate or a $C_{2-6}$ hydroxyalkyl methacrylate (iii), and a hydroxyalkyl methacrylate (b) having a $C_{3-8}$ hydroxyalkyl group having 1 or 2 hydroxy groups,
    wherein the cured urethane oligomer (a) has a glass transition temperature of −20° C. or lower.

2. The process according to claim 1, wherein the above urethane oligomer (a) has a polyoxyalkylene chain.

3. The process according to claim 1, wherein the curable resin composition further contains an alkyl methacrylate (c) having a $C_{8-22}$ alkyl group.

4. The process according to claim 3, wherein the content of the alkyl methacrylate (c) is at most 50 mass %, in the curable resin composition.

5. The process according to claim 1, wherein all of the curable functional groups of the urethane oligomer (a) are acryloyloxy groups.

6. The process according to claim 1, wherein the content of the urethane oligomer (a) is at least 20 mass %, and the content of the hydroxyalkyl methacrylate is at least 25 mass %, in the curable resin composition.

7. The process of claim 1, comprising a first step of forming a sealed space having the curable resin composition internally accommodated between the pair of transparent substrates, in a first atmosphere, and a second step of curing the curable resin composition in a state where the outside of the sealed space is made to be a second atmosphere having a pressure higher than the first atmosphere.

8. The process for producing a transparent laminate according to claim 7, wherein in the first step, a sealed portion is provided on the periphery of the surface of one transparent substrate, and the curable resin composition is supplied to the area surrounded by the sealed portion, and in the above first atmosphere, the other transparent substrate is pushed towards the surface of the above one transparent substrate to expand the curable resin composition and to form the sealed space having the curable resin composition interposed between the pair of the transparent substrates at the same time.

9. The process for producing a transparent laminate according to claim 7, wherein the pressure in the above first atmosphere is at most 1 kPa, and the pressure in the above second atmosphere is higher by at least 100 kPa than the pressure in the above first atmosphere.

10. The process for producing a transparent laminate according to claim 7, wherein at least one of the pair of the transparent substrates is a glass plate.

11. The process for producing a transparent laminate according to claim 7, wherein the pair of the transparent substrates are a pair of curved substrates having almost the same curvature.

12. The process according to claim 1, wherein the urethane oligomer (a) has from 2 to 4 curable functional groups on average which are either or both of an acryloyloxy group and a methacryloyloxy group, per molecule.

13. The process according to claim 1, wherein the transparent laminate has a haze value of at most 1%.

14. The process according to claim 1, wherein the transparent laminate is made by adhering a face surface of a first transparent substrate to the face surface of a second transparent substrate to form a transparent laminate in which the face surface of the first transparent substrate is directly bonded to the face surface of the second transparent substrate through the curable resin composition.

15. The process according to claim 1, wherein the polyoxyalkylene of the urethane oligomer reaction product has a number average molecular weight of the polyoxyalkylene polyol per hydroxyl group of from 600-5,000.

16. The process according to claim 15, wherein the aliphatic or alicyclic diisocyanate (ii) of the urethane oligomer reaction product is isophorone diisocyanate.

17. The process according to claim 1, wherein (iii) is a $C_{2-6}$ hydroxyalkylacrylate.

18. A transparent laminate comprising a pair of transparent substrates and a cured resin layer interposed between the pair of transparent substrates, wherein the cured resin is a cured product formed by the process as defined in claim 1.

19. The transparent laminate according to claim 18, which is a transparent laminate with a size having at least one side being 600 mm or longer.

* * * * *